United States Patent Office 2,907,661
Patented Oct. 6, 1959

2,907,661
PRODUCTION OF FERMENTED SAUSAGE

Charles F. Niven, Jr., Chicago, and Robert H. Deibel and George D. Wilson, Park Forest, Ill., assignors to A. W. Brickman, Victor Conquest, Frank J. Madden, Wrisley B. Oleson, and Emery T. Filbey, Chicago, Ill., as trustees No Drawing. Application November 14, 1955
Serial No. 546,792

4 Claims. (Cl. 99—109)

This invention relates to improved fermented sausages and to a method of making said improved fermented sausages.

Not until very recent times has the formulation of fermented sausages such as cervalet, summer sausage, salami, thuringer and the like begun to move out of the area of art into the field of science. In years past, the preparation of this particular type of seasoned meat emulsion was little more than a matter of chance with such attendant spoilage. The meat emulsion was contaminated with various organisms indigenous to the sausage ingredients which originated in the individual establishments. These contaminants were responsible for the distinctive flavor of the sausages produced in said establishments. This method of chance inoculation of organisms of unascertained types naturally led to unpredictable, unexplainable results. In the absence of any basic knowledge of the causes, spoilage could only be blamed on supposedly improper curing means and curing conditions.

Now it is established that chemical and bacteriological changes within the meat emulsion effect proper aging, coloring, and stabilizing of meat. Aging and coloring are related to taste and appearance, of course, and stabilizing of the meat characterizes its spoilage-resisting property. These chemical and bacteriological changes are superbly achieved by the present invention wherein a pure culture of *Pediococcus cerevisiae* is employed as an inoculum. Additionally, by the use of *Pediococcus cerevisiae* as the fermenting bacterium a very substantial reduction is achieved in production time. These and other incidental benefits will be further established in the following description of the invention.

*Pediococcus cerevisiae*, as employed in describing the present invention, embraces *Pediococcus damnosus, Pediococcus perniciosus, Pediococcus sarcinaeformis, Pediococcus tetragenus, Pediococcus acidi lactici, Streptococcus damnosus, Streptococcus damnosus* var. *viscosus* and *Streptococcus damnosus* var. *pentosaceus*, and others, these having been established by Pederson and reported in Bacteriol. Rev., 13, 225–232, as all being the same species although classified as severally distinct by earlier researchers.

Because of the salt content in conventional sausage formulations, the particular strains of *Pediococcus cerevisiae* to be employed in the practice of this invention are generally those strains having a minimum salt tolerance of about 5 percent and essentially in the approximate range of from about 5 to 8 percent. Such salt-tolerant strains are selectively developed by using laboratory broth cultures containing gradient amounts of salt as is commonly done in the art.

*Pediococcus cerevisiae* is a gram-positive coccus which occurs in clusters with a tendency toward tetrad formation. Nitrates are not reduced and gelatin is not hydrolyzed. Catalase activity is weak or not demonstrable. Sugars are actively fermented with the accumulation of large amounts of lactic acid. Little or no gas is produced during fermentation.

To categorize the sundry types of sausages, including those specifically named above and other types as well, "meat emulsion" is used as a generic description although in that phrase the term "emulsion" may not be used in its strictest technical sense. In most sausage formulation, however, there is an attempt made to achieve at least a substantial emulsification of the meats.

In initiating the practice of this invention, a culture of salt-tolerant *Pediococcus cerevisiae* is started in a glucose-tryptone-yeast extract broth or any other satisfactory medium. The inoculated broth is incubated at a suitable temperature, for example, 85 to 100° F. for approximately 24 hours or until satisfactory growth is achieved. The bacterial cells are then removed from the medium by centrifuging and the cells are resuspended in distilled water, usually an amount equivalent to one-tenth to one-twentieth the volume of the original growth medium. If the bacterial cells are to be held for some time, they can be resuspended in very nominal amounts of water and freeze dried or lyophilized to put the bacteria in a very stable, readily suspended physical state. The method of employing the suspension is described in the following illustrative example directed to sausage formulation.

This method of growth and preparation of inoculum may be varied as convenience dictates. For example, the entire culture may be added to the sausage emulsion without centrifuging and resuspending in distilled water provided a growth medium is employed which will not impart a flavor to the sausage.

Example I

| | |
|---|---:|
| Trimmed bull rounds | 33.3 |
| Trimmed cow rounds | 33.3 |
| "Certified" regular belly trimmings | 28.5 |
| Ground black pepper | 0.41 |
| Ground nutmeg | 0.05 |
| Ground coriander | 0.12 |
| Dextrose | 1.4 |
| Sodium chloride | 2.9 |
| Sodium nitrate | 0.02 |
| | 100.00 |

The beef and pork belly trimmings are ground or cut separately to achieve the desired degree of fineness. Thereafter both are put together in a mixer where the spices, dextrose and sodium chloride are added in dry form. The sodium nitrite also may be added dry along with the above ingredients, but it is preferred that it be dissolved in a minimum amount of water before adding. While the above ingredients are being mixed the inoculum is most conveniently added by sprinkling or spraying the aqueous suspension of *Pediococcus cerevisiae* onto the meat emulsion. The amount of inoculum is adjusted such that a 100 pound batch of sausage will be inoculated with the cell crop from one pint of medium. This exemplifying concentration is designated as a one percent inoculum. Depending upon the desired tanginess of the product, this percent of inoculum may, however, vary from $\frac{1}{50}$ to 2 percent, those values respectively corresponding to $\frac{1}{3000}$ and $\frac{1}{30}$ ounce of viable cells per 100 pounds of meat emulsion.

Finally, the meat emulsion is packaged in package form such as cellulose or natural casings and placed in the smokehouse.

For reasons to be developed, considerable variation is possible in handling the meat during the fermenting period but the principal underlying this portion of the process is maintaining the inoculated meat emulsion at conditions of temperature favorable to the growth of the *Pediococcus cerevisiae*. This temperature range is from 45° F. to 115° F. The following is an illustrative schedule of smokehouse disposition of the sausage:

*Example II*

(1) First 4 hours at 85° F. at a relative humidity of 90 percent.

(2) Following 42 hours at 95° F. at a relative humidity of 85 percent.

(3) Final 2 hours at a gradually increasing temperature to a peak of about 120° F. sufficient to establish an internal temperature in the sausage of 105° F.

A 1 percent inoculum has been found to be most desirble for the foregoing schedule. With a minimum $\frac{1}{30}$ percent initial inoculation, or as dictated by production schedules, it may be desirable to extend the initial period at 85° F. up to 48 hours. This procedure is employed when certified pork or pork fat is used as one of the meat ingredients. This procedure is equally applicable to products finished at temperatures sufficient to kill trichinae.

Lastly, the meat emulsion is removed from the smokehouse and hung in the holding room. In the smokehouse, the bacteria grow and develop very rapidly during which time the cells produce large quantities of lactic acid. It can be said that the meat emulsion should be held in the smokehouse until a pH of 5 or lower is reached; at a lower pH Pediococcus is essentially inactive.

It is to be noted that sodium nitrate is not present in the curing ingredients for the reason that *Pediococcus cerevisiae* does not reduce nitrate to nitrite. However, this does not preclude the use of nitrate in the cure if so desired.

From the practice of this invention, it is possible to manufacture table-ready meats in as little as two days time compared to present day methods which require five to seven days. This shorter period is due to the fact that there is no need for a holding period prior to the time of smoking. Additionally, *Pediococcus cerevisiae* permits use of a nitrite cure and thus eliminates the time formerly required for nitrate reduction. Without regard to the improvements in the method of manufacture, there are many beneficial attributes in the product. Meat emulsions prepared by this method possess superb stability in exhibiting greatly reduced spoilage incidence. Product results are consistently good so that the use of high quality meat ingredients can be easily justified where spoilage risk is so greatly reduced.

Having thus described the invention, we claim:

1. A method of preparing a fermented sausage which comprises inoculating a meat emulsion with *Pediococcus cerevisiae* in a ratio up to $\frac{1}{30}$ of an ounce per one-hundred pounds of meat emulsion, and maintaining the inoculated meat emulsion at those temperatures favorable to the growth of said *Pediococcus cerevisiae*.

2. A method of preparing a fermented sausage which comprises inoculating a meat emulsion with *Pediococcus cerevisiae* in the ratio of one-three-thousandths to one-thirtieth ounces per one-hundred pounds of meat emulsion, and maintaining the inoculated meat emulsion at those temperatures favorable to the growth of said *Pediococcus cerevisiae*.

3. A method of preparing a fermented sausage which comprises inoculating a meat emulsion with from $\frac{1}{50}$ to 2% by weight of a pure culture of *Pediococcus cerevisiae* in accordance with the desired tanginess of the product, and maintaining the inoculated meat emulsion at those temperatures most favorable to the growth of said *Pediococcus cerevisiae*.

4. A method of preparing a fermented sausage which comprises adding sodium nitrite to a salted meat emulsion and inoculating the meat emulsion with from $\frac{1}{50}$ to 2% by weight of a pure culture of salt tolerant *Pediococcus cerevisiae* in accordance with the tangy flavor required, said *Pediococcus cerevisiae* constituting the only bacterial inoculum, thereafter maintaining the inoculated meat emulsion at temperatures favorable to the growth of the *Pediococcus cerevisiae*, and permitting the *Pediococcus cerevisiae* to grow until a pH is reached at which the *Pediococcus cerevisiae* is essentially inactive.

References Cited in the file of this patent

UNITED STATES PATENTS

| | | |
|---|---|---|
| 1,380,070 | Kurk | May 31, 1921 |
| 1,685,630 | Drake | Sept. 25, 1928 |
| 2,225,783 | Jensen | Dec. 24, 1940 |

OTHER REFERENCES

"Bergey's Manual of Determinative Bacteriology," sixth edition, 1948, by R. S. Breed et al., published by The Williams and Wilkins Co., page 249.

UNITED STATES PATENT OFFICE

CERTIFICATE OF CORRECTION

Patent No. 2,907,661                                                 October 6, 1959

Charles F. Niven, Jr. et al.

It is hereby certified that error appears in the printed specification of the above numbered patent requiring correction and that the said Letters Patent should read as corrected below.

Column 2, line 40, Example I, for "Sodium nitrate" read -- Sodium nitrite --; column 3, lines 12 and 13, Example II, for "desirble" read -- desirable --.

Signed and sealed this 12th day of April 1960.

(SEAL)
Attest:

KARL H. AXLINE
Attesting Officer

ROBERT C. WATSON
Commissioner of Patents